(12) United States Patent
Erkmen et al.

(10) Patent No.: US 12,132,523 B2
(45) Date of Patent: *Oct. 29, 2024

(54) PHASE SHIFTER ARCHITECTURE FOR LARGE-ELEMENT-COUNT OPTICAL PHASED ARRAYS

(71) Applicant: X DEVELOPMENT LLC, Mountain View, CA (US)

(72) Inventors: Baris Ibrahim Erkmen, Sunnyvale, CA (US); Devin Brinkley, Redwood City, CA (US); Paul Epp, Sunnyvale, CA (US); John Moody, Belmont, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,405

(22) Filed: Sep. 27, 2023

(65) Prior Publication Data
US 2024/0022331 A1 Jan. 18, 2024

Related U.S. Application Data

(63) Continuation of application No. 17/505,817, filed on Oct. 20, 2021, now Pat. No. 11,804,906.

(60) Provisional application No. 63/194,362, filed on May 28, 2021.

(51) Int. Cl.
*H04B 10/50* (2013.01)
*H04B 10/548* (2013.01)

(52) U.S. Cl.
CPC ..... *H04B 10/5053* (2013.01); *H04B 10/5051* (2013.01); *H04B 10/5055* (2013.01); *H04B 10/548* (2013.01)

(58) Field of Classification Search
CPC .................. H04B 10/50–50597; H04B 10/70
See application file for complete search history.

(56) References Cited

U.S. PATENT DOCUMENTS

| 10,074,901 B2 | 9/2018 | Byun et al. |
| 10,613,410 B2 | 4/2020 | Hosseini et al. |
| 11,409,183 B1 | 8/2022 | Gehl et al. |
| (Continued) | | |

OTHER PUBLICATIONS

Chung, et al., "A monolithically integrated large-scale optical phased array in silicon-on-insulator CMOS", IEEE Journal of Solid-State Circuits, Jan. 2018, p. 1-22, vol. 53, No. 1.

*Primary Examiner* — Nathan M Cors
(74) *Attorney, Agent, or Firm* — Botos Churchill IP Law

(57) ABSTRACT

A system includes a transmitter configured to output an optical signal. The transmitter includes a seed laser, an optical array including a plurality of array elements, and a plurality of phase shifters in a multi-layer arrangement. The multi-layer arrangement includes a plurality of layers between the seed laser and the optical array, wherein a first layer of the plurality of layers transmits light to a second layer of the plurality of layers. The first layer has fewer phase shifters than the second layer. The multi-layer arrangement also includes a plurality of branches wherein each branch includes a phase shifter from each of the plurality of layers connected in series between the seed laser and one of the plurality of array elements. Each phase shifter is configured to shift the optical signal incrementally to amass a total phase shift for each of the plurality of array elements.

20 Claims, 5 Drawing Sheets

(56) References Cited

U.S. PATENT DOCUMENTS

| | | | |
|---|---|---|---|
| 11,804,906 B2* | 10/2023 | Erkmen | H04B 10/5051 |
| 2018/0052378 A1 | 2/2018 | Shin et al. | |
| 2019/0056634 A1 | 2/2019 | Hosseini et al. | |
| 2020/0264490 A1* | 8/2020 | Zhu | G02F 1/292 |
| 2021/0135761 A1* | 5/2021 | Tanaka | H04B 10/541 |
| 2021/0320725 A1* | 10/2021 | Qiang | H04B 10/70 |

* cited by examiner

|   | A | B | C | D | E | F | G | H |
|---|---|---|---|---|---|---|---|---|
| 1 | o | o | o | o | o | o | o | o |
| 2 | o | o | o | o | o | o | o | o |
| 3 | o | o | o | o | o | o | o | o |
| 4 | o | o | o | o | o | o | o | o |
| 5 | o | o | o | o | o | o | o | o |
| 6 | o | o | o | o | o | o | o | o |
| 7 | o | o | o | o | o | o | o | o |
| 8 | o | o | o | o | o | o | o | o |

PHASE SHIFTER ARCHITECTURE FOR LARGE-ELEMENT-COUNT OPTICAL PHASED ARRAYS

CROSS REFERENCE TO RELATED APPLICATIONS

The present application is a continuation of U.S. patent application Ser. No. 17/505,817, filed Oct. 20, 2021, which claims the benefit of U.S. Provisional Application No. 63/194,362, filed May 28, 2021, the entire disclosure of which is incorporated by reference herein.

BACKGROUND

Wireless optical communication enables high-throughput and long-range communication, in part due to high gain offered by the narrow angular width of the transmitted beam. However, the narrow beam also requires that it must be accurately and actively pointed in order to remain aligned to the terminal aperture at the remote end. This pointing may be accomplished by small mirrors (e.g., MEMS or voice-coil based fast-steering mirror mechanisms) that are actuated to steer the beam. In other implementations, electro-optic steering of beams with no moving parts is used to steer the beam, which provides cost, lifetime and performance advantages. Optical Phased Arrays (OPAs) are a critical technology component, with added benefits on adaptive-optics, point-to-multipoint support, and mesh network topologies. Each active element in the OPA requires electro-optic phase shifting capability.

BRIEF SUMMARY

Aspects of the disclosure provide for a system. The system includes a transmitter configured to output an optical signal. The transmitter includes a seed laser, an optical array including a plurality of array elements, and a plurality of phase shifters in a multi-layer arrangement. The multi-layer arrangement includes a plurality of layers between the seed laser and the optical array, wherein a first layer of the plurality of layers transmits light to a second layer of the plurality of layers, the first layer having fewer phase shifters than the second layer, and a plurality of branches wherein each branch includes a phase shifter from each of the plurality of layers connected in series between the seed laser and one of the plurality of array elements. Each phase shifter is configured to shift the optical signal incrementally to amass a total phase shift for each of the plurality of array elements.

In one example, the plurality of array elements is in a grid of 2N×2N array elements, and the multi-layer arrangement has 2N layers with each layer doubling a number of phase shifters from a previous layer. In this example, a first N layers are configured to shift an optical signal in a first axis, and a second N layers are configured to shift an optical signal in a second axis. Further in this example, the first axis is an x-axis, and the second axis is a y-axis. Alternatively in this example, each of the plurality of phase shifters is configured to provide a maximum phase shift that is less than $2\pi$. In this example, the first layer includes first phase shifters having a maximum phase shift equal to $\pi/(1-2-N)$, the second layer includes second phase shifters having a maximum phase shift equal to $\pi/(1-2-N)/2$. Further in this example, each subsequent layer for shifting along a given axis has a maximum phase shift that is half of a previous layer.

In another example, the total phase shift is $2\pi$ or less per axis of control. In this example, the total phase shift is ±3 degrees. Alternatively in this example, the total phase shift is ±45 degrees. In a further example, the system also includes one or more processors configured to determine instructions for each of the plurality of phase shifters based on the multi-layer arrangement to cause the optical signal to point in a pointing direction; and transmit the optical signal. In this example, the one or more processors are further configured to determine a location of a remote communication device; and determine the pointing direction for the optical signal based on the determined location. Alternatively in this example, the one or more processors are configured to determine the instructions based on a linear equation including an input vector where each row is a phase-shift value for a given phase shifter in the plurality of phase shifters; an output vector where each row is the total phase shift for a given array element in the plurality of array elements; and a matrix where each (i,j)th entry is "1" when a jth phase shifter is along a branch corresponding to an ith array element.

In yet another example, the system also includes one or more bias means for controlling the plurality of phase shifters. In this example, the one or more bias means includes a thermal bias means configured to shift a midpoint of a thermo-optical phase shifter or an electro-optical phase shifter. Further in this example, the thermal bias means is configured to provide heat to the thermo-optical phase shifter or the electro-optical phase shifter. Also in this example, the one or more bias means includes a voltage bias means configured to shift a midpoint of an electro-optical phase shifter. Further in this example, the voltage bias means is configured to provide a high voltage direct current to the electro-optical phase shifter. In an alternative example, the system also includes one or more processors configured to perform small-angle steering using shifts at the plurality of phase shifter and large-angle steering using the one or more bias means. In this example, the one or more processors are configured to split a desired shift for a given phase shifter into a high-frequency component and a low-frequency component by means of digital signal filtering; route the high-frequency component to the plurality of phase shifters; and route the low-frequency component to the one or more bias means.

BRIEF DESCRIPTION OF THE DRAWINGS

FIG. 2 is a pictorial diagram of an optical phased array in accordance with aspects of the disclosure.

DETAILED DESCRIPTION

Overview

The technology relates to a phase shifter architecture that is smaller than a traditional arrangement of one phase shifter per array element. Optical phased arrays include phase shifters and array elements that are used to form and steer a coherent beam. The traditional arrangement for a large element count may need a large footprint, which increases cost and complexity for manufacturing integrated photonic chips and limits design options for optical communication devices.

The architecture for the plurality of phase shifters includes a cascade of phase shifters. In other words, the architecture includes a plurality of layers of phase shifters. Phase shifters in a first layer may be connected in series with one or more phase shifters in a second layer; phase shifters in the second layer may further be connected in series with one or more phase shifters in a third layer; and each phase shifter in the third layer may be connected to an optical array element in the optical phased array. Other implementations may include more or less layers.

In operation, the one or more processors may determine instructions for each of the plurality of phase shifters. The instructions cause the plurality of phase shifters to cause the light transmitted by the seed laser to form a communication beam via the optical phased array. To determine the instructions, the one or more processors may calculate the shift for each phase shifter based on a desired pointing direction of a communication beam. The desired pointing direction may be based on a received or predicted location of a remote communication device. The one or more processors may send the instructions to the plurality of phase shifters and transmit a communication beam in the desired pointing direction.

The features described herein may provide smaller, more cost-effective integrated photonic chips. The smaller chips associated with a large number of array elements may be used in smaller optical devices. While the features may limit the practical steering range, they would be adequate for correcting beam distortions and imperfections in the optical wavefront, because typical element spacing is at a much smaller scale (micrometer scale) than the typical atmospheric coherence lengths for optical aberrations. As such, the area occupied by the phase shifters may be reduced without significantly compromising performance of the optical phased array, which would reduce its cost (proportional to area occupied on the manufacturing wafer), increase manufacturing yield, reduce complexity of control electronics and processing, simplify mechanical packaging, and also limit the thermal management of the chip in operation.

Example Systems

Figure 1:
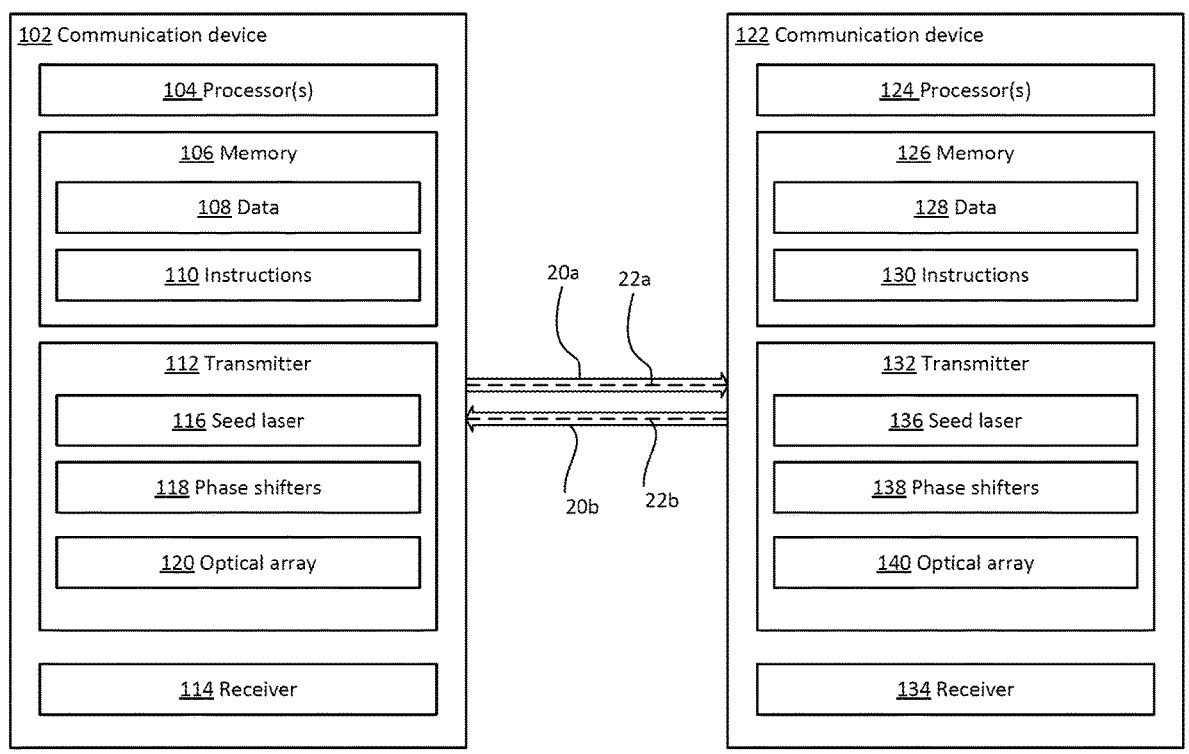
FIG. 1 is a block diagram 100 of a first communication device and a second communication device in accordance with aspects of the disclosure.

FIG. 1 is a block diagram 100 of a first communication device of a first communication terminal configured to form one or more links with a second communication device of a second communication terminal, for instance as part of a system such as a free-space optical communication (FSOC) system. For example, a first communication device 102 includes one or more processors 104, a memory 106, a transmitter 112, and a receiver 114.

The one or more processors 104 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 104 and memory 106 as being within the same block, the one or more processors 104 and memory 106 may actually comprise multiple processors and memories that may or may not be stored within the same physical housing. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, such as memory 106, calibration information, such as one or more offsets determined for tracking a signal, may be stored.

Data 108 may be retrieved, stored or modified by the one or more processors 104 in accordance with the instructions 110. For instance, although the system and method is not limited by any particular data structure, the data 108 may be stored in computer registers, in a relational database as a table having a plurality of different fields and records, XML documents or flat files. The data 108 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 108 may comprise any information sufficient to identify the relevant information, such as numbers, descriptive text, proprietary codes, references to data stored in other areas of the same memory or different memories (including other network locations) or information that is used by a function to calculate the relevant data.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 may be in communication with the transmitter 112 and the receiver 114. Transmitter 112 and receiver 114 may be part of a transceiver arrangement in the communication device 102. The one or more processors 104 may therefore be configured to transmit, via the transmitter 112, data in a signal, and also may be configured to receive, via the receiver 114, communications and data in a signal. The received signal may be processed by the one or more processors 104 to extract the communications and data.

The transmitter 112 may include a light source, such as seed laser 116, a plurality of phase shifters 118, and an optical array 120. For example, the transmitter 112 may be an integrated photonic optical phased array. The seed laser 116 may be a light-emitting diode (LED), a laser diode, a fiber laser, or a solid-state laser. The light output of the seed laser 116 may be controlled by a current applied directly to the seed laser, such as from a modulator that modulates a received electrical signal. Light transmitted from the seed laser 116 is received by the plurality of phase shifters 118.

The phase shifters 118 alter the light and provide the light to the optical array 120. The optical array 120 outputs the light as a coherent communication beam to be received by a remote communication device, such as second communication device 122. The optical phased array includes a plurality of array elements. The plurality of array elements may be arranged in a grid pattern with a consistent pitch, or distance, between adjacent elements. In the example shown in FIG. 2, optical array 120 has 64 array elements arranged in eight rows (1-8) and eight columns (A-H). In other examples, the array elements may be in different arrangements having different numbers of rows and columns, different shapes, and/or different pitch (consistent or inconsistent).

The architecture for the plurality of phase shifters 138 includes a cascade of phase shifters. In other words, the architecture includes a plurality of layers of phase shifters. Phase shifters in a first layer may be connected in series with one or more phase shifters in a second layer; phase shifters in the second layer may further be connected in series with one or more phase shifters in a third layer; and so on up to a final layer. Each phase shifter in the final layer may be connected to an optical array element in the optical array.

In one implementation, the cascade of phase shifters may be in a tree structure. The tree structure includes, for each input from the previous layer, two or more phase shifters in a layer, arranged in parallel to one another. When the phase shifter architecture has two phase shifters for every input at each layer, the architecture can support a $2^N \times 2^N$ square optical array with 2N layers of phase shifters, where the first N layers shift an optical signal in a first axis, and the second N layers shift the optical signal in a second axis.

Figure 3:
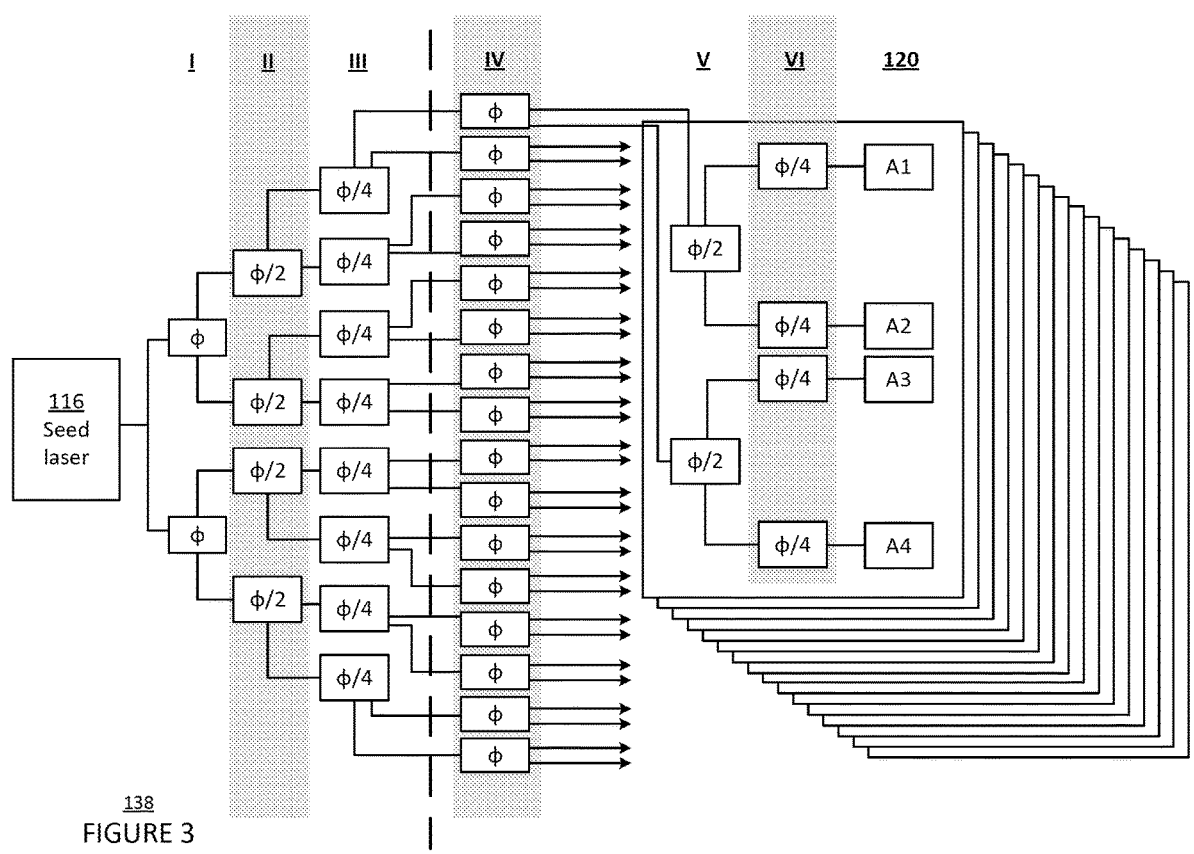
FIG. 3 is a pictorial diagram of a phase shifter architecture in accordance with aspects of the disclosure.

As shown in FIG. 3, there may be six layers I-VI of phase shifters. There are two first phase shifters in the first layer I; each first phase shifter is connected to two second phase shifters in the second layer II; each second phase shifter is connected to two third phase shifters in the third layer III; each third phase shifter is connected to two fourth phase shifters in the fourth layer IV; each fourth phase shifter is connected to two fifth phase shifters in the fifth layer V; each fifth phase shifter is connected to two sixth phase shifters in the sixth layer VI; and each sixth phase shifter is connected to an array element in the optical phased array 120. In FIG. 3, for the sake of readability, only one section of layers V and VI branching from one of the fourth phase shifters is shown. The other sections of layers V and VI branching from the other fourth phase shifters are configured similarly to the illustrated section. Other implementations may include more or less layers.

Using the plurality of phase shifters, light may be shifted incrementally at each layer and accumulate a total phase shift that is output by the array element at the end. The total phase shift is the sum of all phase shifters along a given branch of the tree structure between the emitter (seed laser) and a given array element. The number of layers may be configured to provide about $2\pi$ range of motion for a given array element in each steering dimension or may provide a smaller range of motion. The $2\pi$ range of motion may be $\pm\pi$, or may be different. The a range of motion is achieved by using smaller phase shifters that shift the light in series to add up to a total shift, which provide flexibility in size and design of the area occupied by the phase shifters in the transmitter. For example, to support the $2^N \times 2^N$ square optical array, phase shifters in a first layer that receives the light from the seed laser may have a shift range of $\pi/(1-2^{-N})$, and phase shifters in each subsequent layer may decrease in shift range by ½. Different implementations may include a different combination of shift ranges for the plurality of layers. The different combination may include decreasing the shift range in each subsequent layer by regular or irregular steps, or may be variable.

In the example shown in FIG. 3, light is shifted at six different phase shifters, once at each of the six layers, before reaching the array element for output (e.g., A1, A2, A3, A4, etc.). The six layers I-VI are split between a first group for shifting along a first axis (layers I-III) and a second group for shifting along a second axis (layers IV-VI). The first axis may be the y-axis and the second axis may be the x-axis orthogonal to the y-axis. Phase shifters in layer I is configured to shift up to about $\varphi$ along the y-axis, phase shifters in layer II is configured to shift up to about $\varphi/2$ along the y-axis, and phase shifters in layer III is configured to shift up to about $\varphi/4$ along the y-axis, where $\varphi=\pi/(1-2^{-6})$. Phase shifters in layers IV-VI are configured similarly to layers I-III except they are configured to shift along the x-axis. This results in about $2\pi$ in total possible y-axis shift.

Alternatively, the plurality of phase shifters may be configured based on a maximum desired steering range, which may result in a total phase shift per emitter that exceeds $2\pi$. For example, the steering range may be designed as ±3 degrees in point-to-point optical communications systems, and ±45 degrees in sectorized point-to-multipoint optical communication systems. The plurality of phase shifters may each be able to shift less than $2\pi$, but each branch of the tree structure may add up to more than $2\pi$. In some examples, phase shifters in a final layer for each axis may be configured shift an optical signal enough to reach at least the maximum desired steering range at each array element.

In some implementations, the transmitter may include one or more bias means for controlling one or more phase shifters. For example, a thermal bias or voltage bias may shift a midpoint of a phase shifter, which may further add to the range of motion of the array element provided by the phase shifter architecture. The one or more bias means may include bias control circuitry, a heater, and/or a source for high voltage direct current. To provide a thermal bias, an electro-optic or thermo-optic phase shifter with a heater may provide a low frequency bias for the slower-changing, large-angle tip and tilt of the wavefront. To provide an electrical bias, a high voltage direct current coupled to the electro-optic phase shifter may provide low-frequency, larger-range adjustment. In addition to the low-frequency bias or adjustment, a higher-frequency alternating current voltage coupled to the electro-optic phase shifter may be used for higher frequency adjustments.

The transmitter 112 may be configured to output an optical beam 20a that allows one communication device to locate or communicate with another. A communication link 22a may be formed with a second communication device 122 using the optical beam 20a. In some examples, a communication signal transmitted over the communication link 22a may be a signal configured to travel through free space, such as, for example, a radio-frequency signal or optical signal. When the second communication device 122 receives the optical beam 20a, the second communication device 122 may establish a line-of-sight with the first communication device 102 or otherwise align with the first communication device. As a result, the communication link 22a between the first communication device 102 and the second communication device 122 may be established.

The receiver 114 may include an optical fiber and a tracking system configured to detect the optical beam. The tracking system may include at least a tracking sensor. In addition, the tracking system may also include a lens, mirror, or other system configured to direct a received optical beam to the tracking sensor and/or the optical fiber. The tracking sensor may include a flat surface configured to detect a position of the optical beam on the flat surface. The tracking sensor may include, but is not limited to, a position sensitive detector (PSD), a charge-coupled device (CCD) camera, a focal plane array, a photodetector, a quad-cell, or a CMOS sensor. The tracking sensor may detect a signal location at the tracking sensor and may convert the received optical beam into an electric signal using the photoelectric effect. The tracking system may track the received optical beam, which may be used to counteract disturbances due to scintillation and/or platform motion. The signal received at the optical fiber may be processed to extract data or redirected to a next communication device in a network.

In some implementations, the one or more processors 104 may optionally be in communication with a steering mechanism (such as a mirror or a gimbal) for adjusting the pointing direction of the transmitter 112, receiver 114, and/or optical beam. In particular, the steering mechanism may be a MEMS 2-axis mirror, 2-axis voice coil mirror, or piezo electronic 2-axis mirror. The steering mechanism may be configured to steer the transmitter, receiver, and/or optical beam in at least two degrees of freedom, such as, for example, yaw and pitch. The adjustments to the pointing direction may be made to establish acquisition and connection link, such as communication link 22, between the first communication device 102 and the second communication device 122. In addition, the adjustments may optimize transmission of light from the transmitter and/or reception of light at the receiver. In some implementations, the one or more processors 104 may provide closed loop control for the steering mechanism to adjust pointing direction based upon the optical beam received over the communication link from a transmitting communication device, such as an optical beam received over the communication link 22b from the second communication device 122.

Similarly, the second communication device 122 includes one or more processors, 124, a memory 126, a transmitter 132, and a receiver 134. The one or more processors 124 may be similar to the one or more processors 104 described above. Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transmitter 132 and the receiver 134 of the second communication device 122 may be similar to the transmitter 112 and the receiver 114. The transmitter 132 may include a light source, such as seed laser 136, a plurality of phase shifters 138, and an optical array 140, which may be similar to seed laser 116, a plurality of phase shifters 118, and an optical array 120. The transmitter 132 may output an optical beam 20b to establish a communication link 22b with the first communication device 102, which receives the optical beam 20b. Furthermore, the second communication device 122 may optionally include a steering mechanism similar to the steering mechanism described above.

As shown in FIG. 1, the communication links 22a and 22b may be formed between the first communication device 102 and the second communication device 122 when the transmitters and receivers of the first and second communication devices are aligned. Using the communication link 22a, the one or more processors 104 can send communication signals to the second communication device 122. Using the communication link 22b, the one or more processors 124 can send communication signals to the first communication device 102. In some examples, it is sufficient to establish one communication link 22 between the first and second communication devices 102, 122, which allows for the bi-directional transmission of data between the two devices. The communication links 22 in these examples are FSOC links. In other implementations, one or more of the communication links 22 may be radio-frequency communication links or other type of communication link capable of travelling through free space.

Figure 4:
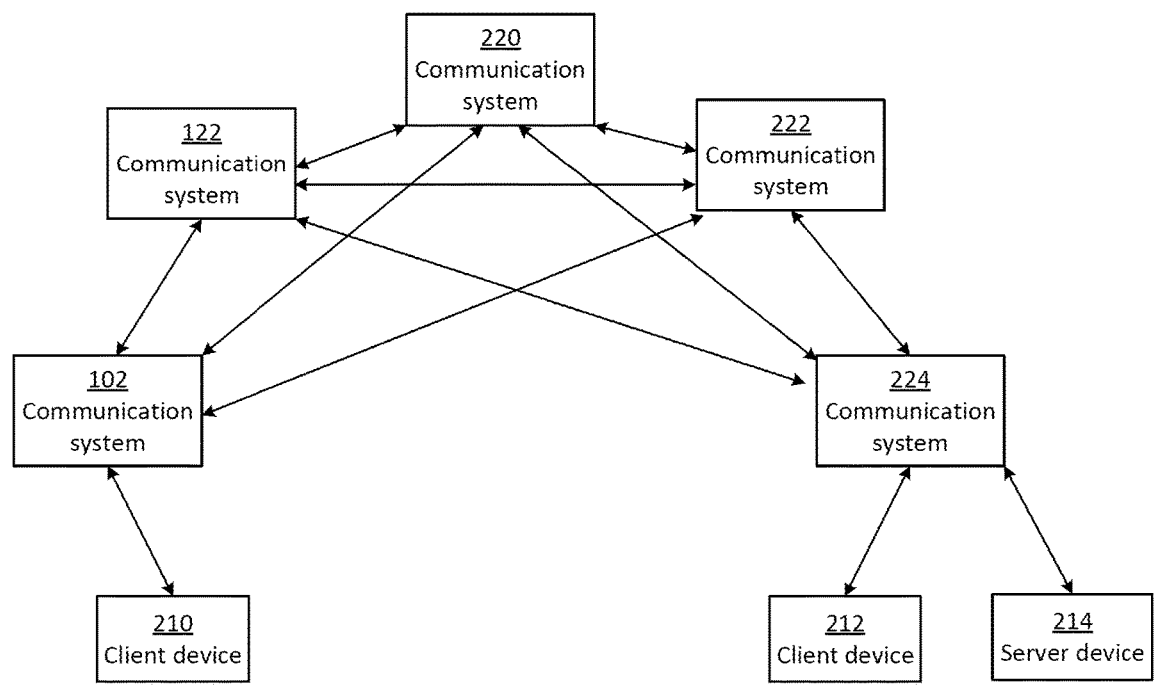
FIG. 4 is a pictorial diagram of a network in accordance with aspects of the disclosure.

As shown in FIG. 4, a plurality of communication devices, such as the first communication device 102 and the second communication device 122, may be configured to form a plurality of communication links (illustrated as arrows) between a plurality of communication terminals, thereby forming a network 200. The network 200 may include client devices 210 and 212, server device 214, and communication devices 102, 122, 220, 222, and 224. Each of the client devices 210, 212, server device 214, and communication devices 220, 222, and 224 may include one or more processors, a memory, a transmitter, a receiver, and optionally a steering mechanism similar to those described above. Using the transmitter and the receiver, each communication device in network 200 may form at least one communication link with another communication device, as shown by the arrows. The communication links may be for optical frequencies, radio frequencies, other frequencies, or a combination of different frequency bands. In FIG. 4, the communication device 102 is shown having communication links with client device 210 and communication devices 122, 220, and 222. The communication device 122 is shown having communication links with communication devices 102, 220, 222, and 224.

The network 200 as shown in FIG. 4 is illustrative only, and in some implementations the network 200 may include additional or different communication terminals. The network 200 may be a terrestrial network where the plurality of communication devices is on a plurality of ground communication terminals. In other implementations, the network 200 may include one or more high-altitude platforms (HAPs), which may be balloons, blimps or other dirigibles, airplanes, unmanned aerial vehicles (UAVs), satellites, or any other form of high altitude platform, or other types of moveable or stationary communication terminals. In some implementations, the network 200 may serve as an access network for client devices such as cellular phones, laptop computers, desktop computers, wearable devices, or tablet computers. The network 200 also may be connected to a larger network, such as the Internet, and may be configured to provide a client device with access to resources stored on or provided through the larger computer network.

EXAMPLE METHODS

Figure 5:
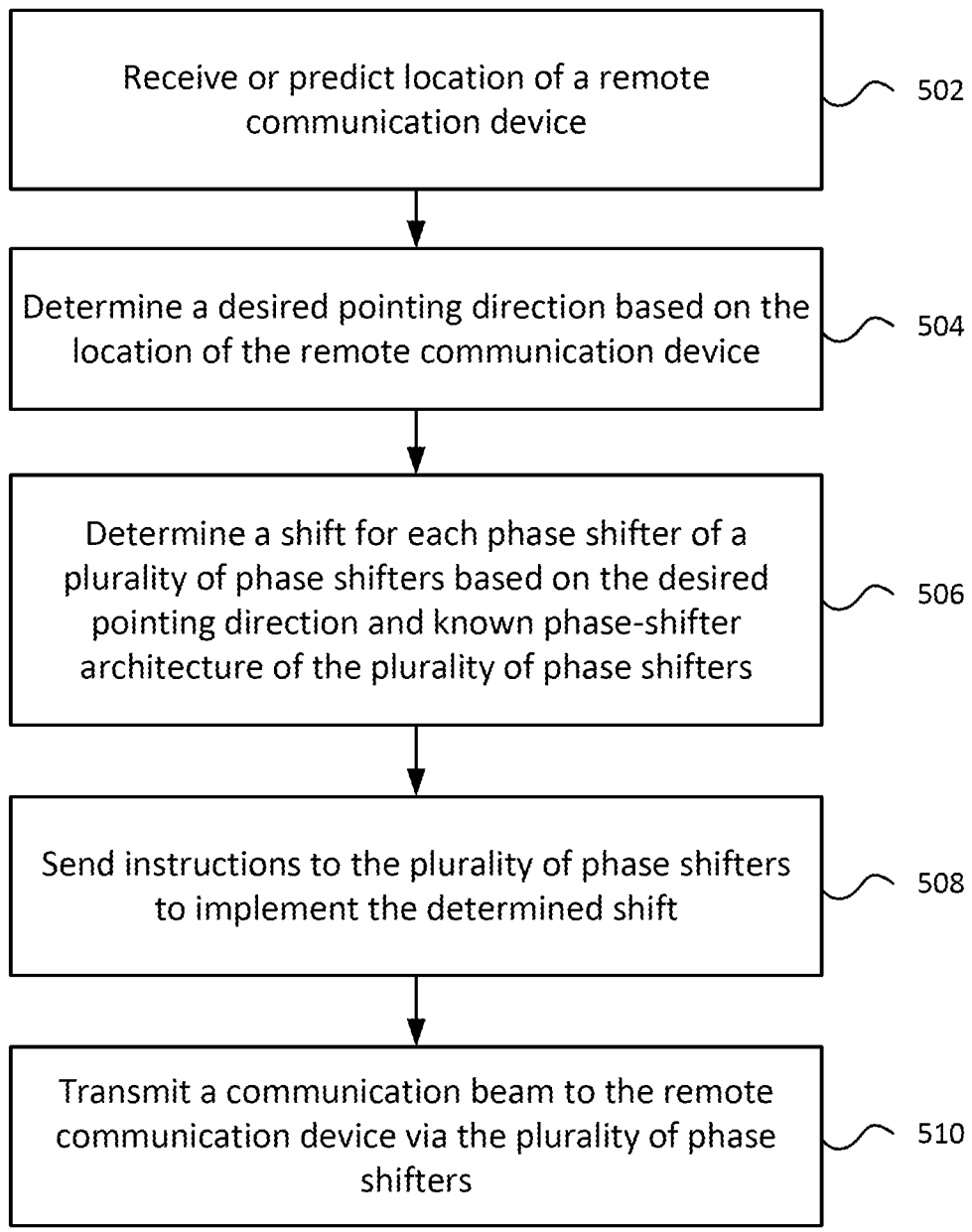
FIG. 5 is a flow diagram in accordance with aspects of the disclosure.

In operation, the one or more processors 104 may determine instructions for each of the plurality of phase shifters 118. The instructions cause the plurality of phase shifters 118 to cause the light transmitted by the seed laser 116 to form an optical beam 20a via the optical array 120. In FIG. 5, flow diagram 500 is shown in accordance with some of the aspects described above that may be performed by the one or more processors 104 of the first communication device 102. Additionally or alternatively, the one or more processors 124 of the second communication device 122 may perform one or more steps of the flow diagram 500. While FIG. 5 shows blocks in a particular order, the order may be varied and that multiple operations may be performed simultaneously. Also, operations may be added or omitted.

At block 502, one or more processors, such as one or more processors 104 of the first communication device 102, may receive or predict a location of a remote communication device, such as the second communication device 122. At block 504, the one or more processors may determine a desired pointing direction for a communication beam based on the location of the remote communication devices. The desired pointing direction may be towards the received or predicted location of the remote communication device.

At block 506, the one or more processors may calculate the shift for each phase shifter in the plurality of phase shifters to achieve the desired pointing direction for the communication beam. For the desired pointing direction, the one or more processors may determine a shift for each phase shifter in the plurality of phase shifters based on the known phase shifter architecture. The shift determination may include solving a matrix of shift assignments. The total phase shift for each emitter can be written as a summation of the phase-shift setting of a subset of phase shifters on the chip. The processor would define an input vector where each row is the phase-shift value for one of the M phase shifters in the tree architecture. The output vector consists of rows where each entry is net phase-shift for one of the N emitters. Then, the output vector is the input vector times a M×N matrix, whose (i,j)th entry is "1" if jth phase shifter is along the tree of the ith emitter, and 0 otherwise. For a given desired steering angle, the controller may multiply the inverse of the matrix with the desired output vector, in order to solve for the values of each phase shifter. Noise in the phase shifters, and implementation imperfections (e.g., quantization of real-numbers) can be modelled and incorporated into the solution to ensure robustness.

At block 508, the one or more processors may send the instructions to the plurality of phase shifters including the shift for each phase shifter. At block 510, the one or more processors may transmit a communication beam in the desired pointing direction. Using the communication beam, the one or more processors may establish a communication link with the second communication device or transfer data to the second communication device.

In this alternative where the transmitter includes a bias means, such as bias control circuitry, the one or more processors may split a desired shift into a high- and a low-frequency component by means of digital signal filtering. The one or more processors may then route the high-frequency component values to the phase shifter architecture to perform faster small-angle steering, and similarly, route the low-frequency component values to the bias control circuitry to perform slower large-angle steering. This method can provide enhanced steering coverage, similar to methods that achieve this optomechanically via fine- and coarse-steering mechanisms.

The features described herein may provide smaller, more cost-effective integrated photonic chips. The smaller chips associated with a large number of array elements may be used in smaller optical devices. While the features may limit the practical steering range, they would be adequate for correcting beam distortions and imperfections in the optical wavefront, because typical element spacing is at a much smaller scale (micrometer scale) than the typical atmospheric coherence lengths for optical aberrations. As such, the area occupied by the phase shifters may be reduced without significantly compromising performance of the optical phased array, which would reduce its cost (proportional to area occupied on the manufacturing wafer), increase manufacturing yield, reduce complexity of control electronics and processing, simplify mechanical packaging, and also limit the thermal management of the chip in operation.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system configured to steer a beam emitted by a seed laser, the system comprising:
   an optical array including a plurality of array elements; and
   a plurality of phase shifters in a multi-layer arrangement, the multi-layer arrangement including:
      a plurality of layers between the seed laser and the optical array, wherein a first layer of the plurality of layers transmits light to a second layer of the plurality of layers, the first layer having fewer phase shifters than the second layer,
      wherein each phase shifter is configured to shift the beam incrementally to obtain a total phase shift for each of the plurality of array elements;
   a coarse steering mechanism; and
   one or more processors configured to perform small-angle steering using shifts at the plurality of phase shifters and large-angle steering using the coarse steering mechanism, wherein the one or more processors are configured to:
      split a desired shift into a high-frequency component and a low-frequency component;
      route the high-frequency component to the plurality of phase shifters; and
      route the low-frequency component to the coarse steering mechanism.

2. The system of claim 1, wherein the coarse steering mechanism includes bias control circuitry that is configured to control a thermo-optical phase shifter or an electro-optical phase shifter.

3. The system of claim 2, wherein the bias control circuitry is configured to provide heat to the thermo-optical phase shifter or to the electro-optical phase shifter.

4. The system of claim 2, wherein the bias control circuitry includes a voltage bias circuit configured to control an electro-optical phase shifter.

5. The system of claim 4, wherein the voltage bias circuit is configured to provide a direct current to the electro-optical phase shifter.

6. The system of claim 1, wherein the coarse steering mechanism includes one or more of a MEMS mirror, a voice coil mirror, or a piezo electronic mirror.

7. The system of claim 6, wherein the coarse steering mechanism includes a voltage bias circuit that is configured to control the one or more mirrors.

8. The system of claim 1, wherein the multi-layer arrangement includes a plurality of branches wherein each branch includes a phase shifter from each of the plurality of layers connected in series between the seed laser and one of the plurality of array elements.

9. The system of claim 1, further comprising the seed laser.

10. The system of claim 1, wherein the one or more processors are configured to split the desired shift by digital signal filtering.

11. A method for steering a beam emitted by a seed laser, the method comprising:
receiving the beam at a multi-layer arrangement of phase shifters, the multi-layer arrangement comprising a first layer with a first number of phase shifters and a second layer with a second number of phase shifters, wherein the second number is more than the first number, wherein each phase shifter is configured to shift the beam incrementally to obtain a total phase shift through the multi-layer arrangement;
one or more processors splitting a desired shift into a high-frequency component and a low-frequency component;
routing the high-frequency component of the desired shift to the phase shifters; and
routing the low-frequency component of the desired shift to a coarse steering mechanism associated with the multi-layer arrangement of phase shifters.

12. The method of claim 11, further comprising activating bias control circuitry of the coarse steering mechanism to control a thermo-optical phase shifter or an electro-optical phase shifter, according to the low-frequency component of the desired shift.

13. The method of claim 12, further comprising the bias control circuitry providing heat to the thermo-optical phase shifter or to the electro-optical phase shifter.

14. The method of claim 12, further comprising the bias control circuitry providing bias voltage to the electro-optical phase shifter.

15. The method of claim 14, wherein providing bias voltage comprises providing a direct current to the electro-optical phase shifter.

16. The method of claim 11, wherein the coarse steering mechanism includes one or more of a MEMS mirror, a voice coil mirror, or a piezo electronic mirror, and the method further comprises activating one or more of the MEMS mirror, the voice coil mirror, or the piezo electronic mirror according to the low-frequency component of the desired shift.

17. The method of claim 16, wherein activating the one or more of the MEMS mirror, voice coil mirror, or piezo electric mirror includes activating a voltage bias circuit.

18. The method of claim 11, further comprising directing the beam from the multi-layer arrangement to an array of optical elements, wherein the multi-layer arrangement includes a plurality of branches wherein each branch includes a phase shifter from each of the plurality of layers connected in series between the seed laser and one of the array of optical elements.

19. The method of claim 11, further comprising emitting the beam from the seed laser.

20. The method of claim 11, wherein the splitting the desired shift includes performing digital signal filtering.

* * * * *

UNITED STATES PATENT AND TRADEMARK OFFICE
CERTIFICATE OF CORRECTION

PATENT NO. : 12,132,523 B2
APPLICATION NO. : 18/475405
DATED : October 29, 2024
INVENTOR(S) : Baris Ibrahim Erkmen et al.

It is certified that error appears in the above-identified patent and that said Letters Patent is hereby corrected as shown below:

In the Claims

Column 12, Line 24, Claim 18:
Now reads: "from each of the plurality of layers"; should read -- from each layer --

Signed and Sealed this
Third Day of December, 2024

Katherine Kelly Vidal
*Director of the United States Patent and Trademark Office*